United States Patent
Gudmundsson et al.

(10) Patent No.: US 10,721,904 B2
(45) Date of Patent: Jul. 28, 2020

(54) METHOD FOR SAMPLING OF MILK IN A MILKING MACHINE AND A MILKING MACHINE

(71) Applicant: DELAVAL HOLDING AB, Tumba (SE)

(72) Inventors: Mats Gudmundsson, Tumba (SE); Thomas Johansson, Tumba (SE); Fernando Mazeris, Tumba (SE)

(73) Assignee: DeLaval Holding AB, Tumba (SE)

( * ) Notice: Subject to any disclaimer, the term of this patent is extended or adjusted under 35 U.S.C. 154(b) by 584 days.

(21) Appl. No.: 15/540,922

(22) PCT Filed: Dec. 15, 2015

(86) PCT No.: PCT/SE2015/051347
§ 371 (c)(1),
(2) Date: Jun. 29, 2017

(87) PCT Pub. No.: WO2016/108747
PCT Pub. Date: Jul. 7, 2016

(65) Prior Publication Data
US 2017/0347615 A1     Dec. 7, 2017

(30) Foreign Application Priority Data
Dec. 30, 2014   (SE) ...................................... 1451667

(51) Int. Cl.
*A01J 5/04*     (2006.01)
*A01J 5/013*    (2006.01)
(Continued)

(52) U.S. Cl.
CPC .............. *A01J 5/045* (2013.01); *A01J 5/007* (2013.01); *A01J 5/013* (2013.01); *A01J 9/00* (2013.01); *A01J 11/00* (2013.01)

(58) Field of Classification Search
CPC .. A01J 5/007; A01J 5/013; A01J 5/045; A01J 9/00; A01J 11/00
See application file for complete search history.

(56) References Cited

U.S. PATENT DOCUMENTS

| | | | |
|---|---|---|---|
| 2004/0168643 A1* | 9/2004 | Nilsson .................... | A01J 5/013 119/14.02 |
| 2010/0180822 A1* | 7/2010 | Holmqvist .............. | A01J 5/044 119/14.2 |
| 2012/0160174 A1* | 6/2012 | Gudmundsson ........ | A01J 5/045 119/14.02 |

FOREIGN PATENT DOCUMENTS

| | | | | |
|---|---|---|---|---|
| CA | 2822183 A1 * | 6/2012 | .............. | A01J 5/045 |
| EP | 1 123 651 A2 | 8/2001 | | |

(Continued)

OTHER PUBLICATIONS

International Search Report dated Mar. 24, 2016, in corresponding PCT application No. PCT/SE2015/051347.

*Primary Examiner* — Monica L Barlow
*Assistant Examiner* — Aaron M Rodziwicz
(74) *Attorney, Agent, or Firm* — Young & Thompson

(57) ABSTRACT

A method for sampling milk in a milking machine includes the steps of attaching teat cups to teats of an animal and starting to milk said teats; receiving a first amount of milk in a milk receiver while keeping an outlet valve device open; closing the outlet valve device; continuing the receiving of milk in the milk receiver; agitating the milk in the milk receiver using an agitation device of a milk sampling arrangement; taking a regular milk sample from the milk in an outlet portion of the milk receiver using a milk sample device of the milk sampling arrangement; and opening the outlet valve device so that the milk can be transferred to a milk tank.

19 Claims, 5 Drawing Sheets

(51) Int. Cl.
*A01J 5/007* (2006.01)
*A01J 9/00* (2006.01)
*A01J 11/00* (2006.01)

(56) References Cited

FOREIGN PATENT DOCUMENTS

| WO | 93/25871 | 12/1993 | | |
| WO | WO-0174148 A1 * | 10/2001 | ............... | G01N 1/10 |
| WO | WO-2008060235 A1 * | 5/2008 | ............ | A01J 5/0132 |
| WO | WO-2009096887 A1 * | 8/2009 | .............. | A01J 5/045 |
| WO | WO-2009096888 A1 * | 8/2009 | .............. | A01J 5/044 |
| WO | 2013/032397 A1 | 3/2013 | | |

* cited by examiner

METHOD FOR SAMPLING OF MILK IN A MILKING MACHINE AND A MILKING MACHINE

THE BACKGROUND OF THE INVENTION AND PRIOR ART

The present invention relates to a method for sampling of milk in a milking machine and a milking machine. The milking machine comprises teat cups, a milk receiver to which vacuum from a vacuum supply draws milk from the teat cups, and a milk sampling arrangement which comprises an agitation device configured to provide a stirring process of the milk in the milk receiver, a milk sample device configured to extract a milk sample from the milk in the milk receiver, and an outlet valve device configured to control the milk flow out of the milk receiver.

Mastitis is a common and expensive illness among dairy cattle. A measure for detecting mastitis is the somatic cell count in the milk produced. However, the increase in somatic cell count which indicates subclinical mastitis may be rather small, e.g. 5-10% in milk from an infected udder quarter. This corresponds to an increase of only 1-2% if milk from the whole udder is analyzed. Determination of such a small increase requires very high accuracy, especially since the somatic cell count anyhow varies over time.

Untreated milk stratifies into layers due to the different density of the substances included in the milk. An upper layer of the untreated milk for example includes a much higher fat content than the lower layers. In order to increase the accuracy of milk samples, it is known to provide receivers with a motor-driven stirrer or the like which agitates the milk in the milk receiver before a milk sample is taken. It is also known to supply air to the milk receiver in order to agitate the milk and provide a substantially homogenous distribution of the substances in the milk receiver before a milk sample is taken. However, all kinds of mechanical treatment of milk increase the content of free fatty acids (FFA) in the milk. A too high content of free fatty acids may e.g. give the milk a rancid taste.

WO 2013/032397 shows a milking arrangement comprising an end unit provided with a motor-driven rotary agitator which provides a stirring movement of the milk collected in the end unit in order to obtain a homogenous distribution of the included substances in the milk. A sampling device takes milk samples of the mixed milk. The sampling device comprises an inlet line extracting milk from an outlet line of the end unit or directly from the end unit.

WO 93/25871 shows a meter for measuring the quantity of milk. Milk samples are collected in a milk sample reservoir on discharge of weighed discrete quantities of milk from the weighing container. There are agitating means for agitating and mixing the milk samples when they have been collected in the milk sample reservoir.

SUMMARY OF THE INVENTION

The object of the present invention is to provide a method for sampling of milk which increases the quality of the milk samples, and a milking machine in which this method is implemented.

This object is achieved by the initially defined method which comprises the steps of: attaching teat cups to teats of an animal and starting to milk said teats; receiving a first amount of milk in the milk receiver while keeping the outlet valve device open; closing the outlet valve device; continuing the receiving of milk in the milk receiver; agitating the milk in the milk receiver using the agitation device; taking a regular milk sample from the milk in an outlet portion of the milk receiver by means of the milk sample device; and opening the outlet valve device so that the milk can be transferred to the milk tank. Since the outlet valve device is kept open while the milk receiver receives the first amount of milk, this initial milk flow from the milking process cleans the inner walls of the milk receiver from milk residues from the previous milking process. This means that milk from the previous milking process cannot contaminate the milk sample taken from the current milking process.

The method may further comprise the step of collecting at least a part of the first amount of milk in a milk conduit in a position downstream of the milk receiver and upstream of a non-activated milk pump. This means that the first amount of milk will be pumped together with the rest of the milk from the milk receiver to the main milk tank.

The method may also comprise the step of activating the agitation device as soon as the milk level in the milk receiver has reached a predetermined level, preferably as soon as the milk level in the milk receiver is high enough to cover the whole agitation member. This ensures that the agitation is gentle for the milk, even though the milk is thoroughly agitated before the milk sample is taken.

The method may further comprise the final step of maintaining the outlet valve device open when the milk receiver has been emptied of milk from a milking process. This means that any remaining milk residues can flow out from the milk receiver before the next milking process begins.

According to an embodiment of the invention, the step of attaching teat cups to teats of an animal and starting to milk said teats comprises, for a selected animal, attaching teat cups only to one or two selected teats and starting to milk said one or two selected teats, and the method comprises the further steps of: after closing the outlet valve device, receiving a second amount of milk in the milk receiver; agitating the milk in the milk receiver using the agitation device; taking a partial milk sample from the milk in an outlet portion of the milk receiver by means of the milk sample device; and, after taking said partial milk sample, attaching teat cups to the remaining teats of the animal and milking said remaining teats. This enables quarter level sampling from a milk receiver which is not separated into separate receivers for each udder quarter.

Previously, unless the milk receiver was divided into separate receivers for each udder quarter, the only way of analyzing milk from a single udder quarter was to sample the milk before it reached the milk receiver. US 2004/0168643 describes a method of obtaining quarter level somatic cell count in this way. Obtaining representative milk samples of the milk before it reaches the milk receiver is however difficult, since the milk moves through the milk tubes in the form of slugs until it reaches the milk receiver. US 2010/0180822 describes one way of sampling the milk from an udder quarter before it reaches the milk receiver, where a milk sample conduit is arranged in a bend of the milk conduit leading from the teat cup to the milk receiver, e.g. in a milk flow meter.

The present inventors have found that by starting to milk just one teat first, and taking a partial milk sample of the milk from this udder quarter in the milk receiver before the other teats are milked, the taking of a partial milk sample from a single udder quarter in the milk receiver becomes possible, and all teats of an animal can be milked in an only slightly prolonged milking session. Using this approach, the decrease in milk production efficiency can be kept at very low figures, such as less than 10%, or even less than 5%. If the same is done for two teats instead of one, this still increases the accuracy of the milk sample analysis.

According to an embodiment of the invention, the selected animal is an animal for which a milk sample analysis of a milk sample taken in connection with a previous milking has determined an elevated risk of a disease, i.e. the analysis provided somewhat elevated figures indicating that mastitis may be present. In this way, it can be determined which teat is infected when a previous regular milk sample has indicated that the animal has an infection.

According to another embodiment of the invention, the selected animal is an animal for which a partial milk sample of milk originating from the one or two selected teats has not been taken for a predetermined period of time, e.g. five days, one week, or one month. This enables the continuous monitoring on quarter level of all animals in the herd, if partial milk samples are regularly taken for each animal for one teat at a time or for different combinations of two teats.

According to an embodiment of the invention, the milk sampling arrangement comprises a control unit controlling the activation of the agitation device, the milk sample device and the outlet valve device. In this way it is possible to achieve an automatic milk sampling process of the milk from a milking process.

According to an embodiment of the invention, the milk sampling device comprises a milk sample outlet configured to extract milk samples from the milk in the outlet portion. The milk sample outlet may be provided with a valve. When the valve is set in an open position, a milk sample is extracted from the milk in the outlet portion of the milk receiver.

According to an embodiment of the invention, the milk sample device and the outlet valve device are included in a bottom structure which is mountable to a bottom portion of the milk receiver. It is usually easy to mount a bottom structure in one piece to a milk receiver. Such a mounting process can be performed very fast. The bottom structure comprises a plurality of components, such as an agitation device by which it is possible to provide a stirring movement of the milk in the milk receiver such that the included substances in the milk obtain a homogenous distribution in the milk receiver. When a milking process has finished, the milk sampling device extracts a milk sample from the mixed milk in the milk receiver. Finally, the outlet valve device is set in an open position such that the milk is discharged out of the milk receiver. Thus, it is possible to take representative samples of the milk in the milk receiver by means of the component included in the bottom structure.

According to an embodiment of the invention, the bottom structure is mounted by means of a releasable connection member to a bottom portion of the milk receiver. In this case, the mounting process of the bottom structure may be performed in a fast and simple manner. Furthermore, it is easy to remove the bottom structure from the milk receiver during service and repair work. The releasable connection member may e.g. comprise a clamp connection. The clamp connection may comprise a clamping ring or a clamping band extending around the periphery of a bottom portion of the milk receiver and an upper portion of the bottom structure and a screw mechanism configured to tighten the ring or band around the periphery portions of the milk receiver and the bottom structure.

According to an embodiment of the invention, the bottom structure defines an outlet portion of the milk receiver located at a lower level than remaining parts of the inner space of the milk receiver. The bottom structure may comprise a housing defining the outlet portion of the milk receiver. The outlet portion may comprise an outlet opening, and the outlet valve device may comprise an outlet valve which in a first position closes the outlet opening and in a second position exposes the outlet opening. With such an outlet valve device it is easy to control the milk flow out of the milk receiver.

According to an embodiment of the invention, the outlet valve device comprises an actuator configured to move the outlet valve between the first closed position and the second open position. The actuator may e.g. be a pneumatic actuator, which is activated by compressed air or a vacuum pressure. The actuator may e.g. be arranged at a bottom portion of the bottom structure. The actuator may comprise a piston rod moving the outlet valve to an upper closed position and to a lower open position.

According to an embodiment of the invention, the bottom structure comprises a housing defining an upper part of the outlet portion having a successively decreased diameter and a lower part having a smaller diameter than the upper part. Such housing forms the outlet portion of the milk receiver. The wider upper part of the outlet portion collects the milk and directs it into the more narrow lower part during an emptying process of the milk in the milk receiver.

According to an embodiment of the invention, the housing comprises an outlet member to be connected to a milk conduit. When the outlet valve is in the open position, the milk leaves the bottom structure via the outlet portion. A milk pump is arranged in the milk conduit at a distance from the bottom structure.

According to an embodiment of the invention, the agitation device comprises an agitation member which is mounted to the bottom structure in such a way that when the bottom structure is mounted to the milk receiver, the agitation member will be arranged on the inside of the milk receiver, an actuator member which is mounted to the bottom structure in such a way that when the bottom structure is mounted to the milk receiver, the actuator member will be arranged outside of the milk receiver, and a movement transmission mechanism configured to transmit movement from the actuator to the actuator member. The actuator may e.g. be a pneumatic actuator providing a reciprocating rectilinear movement to the movement transmission mechanism which transfers this movement to the agitation member.

According to an embodiment of the invention, the actuator and the movement transmission mechanism together provide a swinging movement of the agitation member. The movement transmission mechanism may comprise a rod element which, at one end portion, is connected to the actuator and, at an opposite end portion, is connected to the agitation member. The movement transmission mechanism may comprise a member providing a pivot point for the rod element in a position between the end portions. In this case, the rod element provides a swinging movement around the pivot point when the actuator is activated. As a consequence, the agitation member obtains a corresponding swinging movement around the pivot point. In case the agitation member provides a reciprocating swinging movement at a moderate frequency, it provides a very gentle stirring motion of the milk in the milk receiver without the risk that the free fatty acid content in the milk increases significantly. Such a stirring motion of the milk is usually enough in order to achieve a homogenous distribution of the included substances in the milk before a milk sample is taken of the milk in the milk receiver.

This initially described object is further achieved by the initially defined milking machine in which the milk sample device is, for a selected animal, configured to extract a partial milk sample from milk in the milk receiver after the attachment of teat cups to one or two selected teats of the selected animal but before the attachment of teat cups to the remaining teats of the selected animal. This enables quarter level sampling from a milk receiver which is not separated into separate receivers for each udder quarter.

BRIEF DESCRIPTION OF THE DRAWINGS

The present invention is now to be explained more closely by means of a preferred embodiment which is disclosed as an example and with reference to the attached drawings.

BRIEF DESCRIPTION OF A PREFERRED EMBODIMENT OF THE INVENTION

Figure 1:
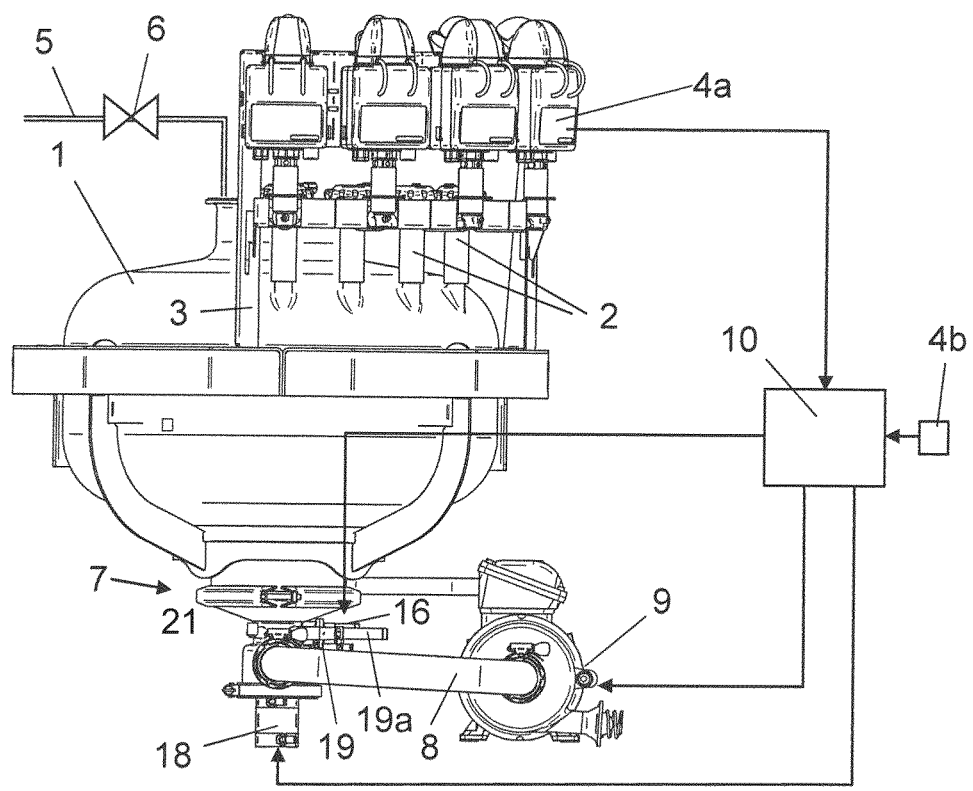
FIG. 1 shows a milk receiver provided with a bottom structure including an agitation device according to the invention.
Figure 2:
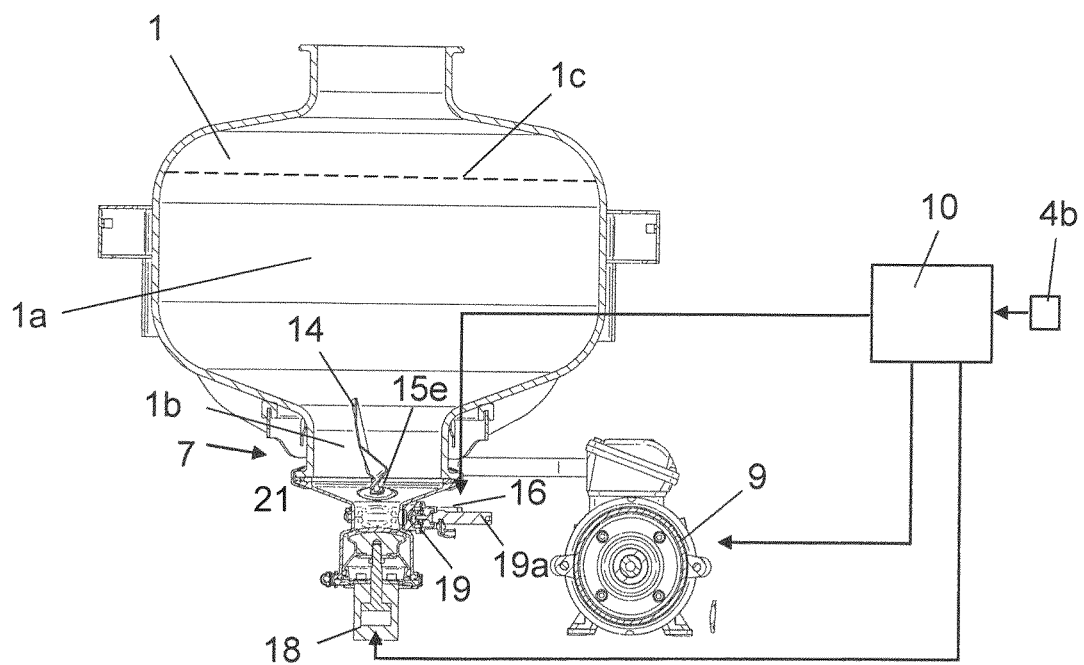
FIG. 2 shows a cross section view of the milk receiver in FIG. 1.

FIGS. 1 and 2 show a milk receiver 1 for the collection of milk from a milking process. The milk receiver 1 comprises four milk inlet portions 2 for the attachment of a respective end portion of a milk tube (the milk tubes are not shown in FIG. 1). Each inlet portion 2 receives milk, via a milk tube, from a teat cup attached to a cow in a milking stall of a milking parlour. The milk receiver 1 is equipped with an external framework 3 for the support of components such as flow meters 4a measuring the milk flow in the respective milk tubes. A schematically indicated milk level meter 4b is arranged in the milk receiver 1. A vacuum source is connectable to the milk receiver 1 by means of a schematically shown vacuum line 5 and vacuum valve 6. The milk receiver 1 comprises a main portion 1a and a lower portion 1b having a smaller diameter than the main portion 1a. A maximum milk level 1c is indicated in FIG. 2. The inner surface of the milk receiver 1 slopes continuously downwardly allowing an efficient emptying of the milk from the milk receiver 1.

A bottom structure 7 may be attached in one piece to the lower portion 1b of the milk receiver 1. The bottom structure is mounted by means of a releasable clamp connection 21 to a bottom portion of the milk receiver 1. The clamp connection 21 comprises a clamping band extending around the periphery of a bottom portion of the milk receiver 1 and an upper portion of the bottom structure 7. A screw mechanism is configured to tighten the band. In this case, the mounting process of the bottom structure 7 may be performed in a fast and simple manner. Furthermore, it is easy to remove the bottom structure 7 from the milk receiver 1 during service or repair work. The bottom structure 7 comprises an agitation device configured to agitate the milk in the milk receiver 1, a milk sample device configured to take a milk sample from the milk in the milk receiver 1, and an outlet valve device configured to control the milk flow out of the milk receiver 1. A milk conduit 8 conveys milk from the milk receiver 1 to a non-shown main milk tank for a plurality of milking stalls in the milking parlour. A milk pump 9 is arranged in the milk conduit 8. A schematically indicated electric control unit 10 controls the emptying of the milk receiver 1 by means of the outlet valve device and the milk pump 9.

When a milking process of a cow is to be performed, a milking robot or an operator attaches the teat cups to the teats of a cow in the milking stall. Milk is sucked from the teat cups, via the milk tubes, to the inlet portions 2 of the milk receiver 1. When the milking process has finished, a milk sample is taken from the milk—the milk sampling process is described in more detail below. When the milk sample has been taken, the control unit 10 sets the outlet valve device in an open position and activates the milk pump 9 such that the milk in the milk receiver 1 flows out from the milk receiver 1 to the milk conduit 8 and the main milk tank.

Alternatively, for a selected cow, a milking robot or an operator attaches teat cups to only one or two teats of the cow. Milk is sucked from these teat cups, via the milk tubes, to the inlet portions 2 of the milk receiver 1. A milk sample can then be taken from these teats before teat cups are connected to the remaining teats.

Figure 3:
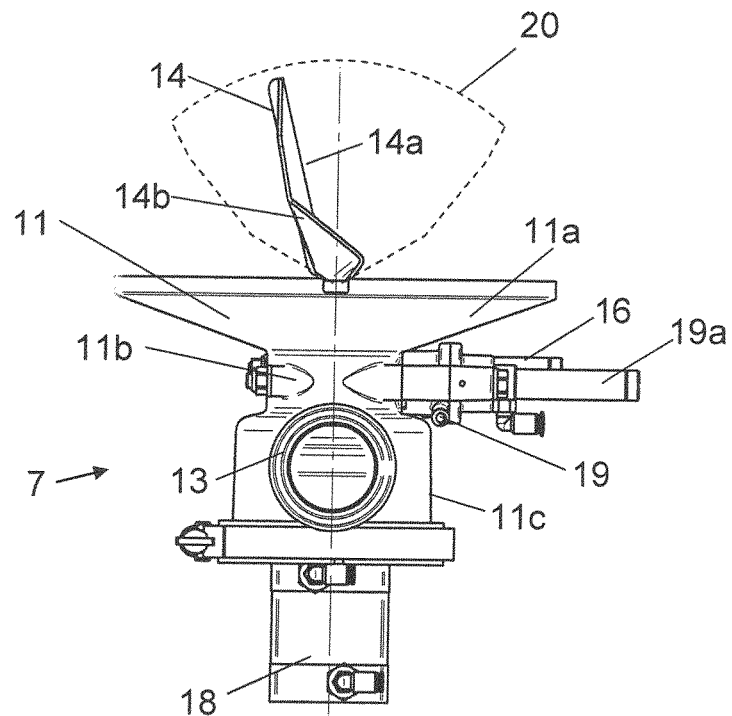
FIG. 3 shows the bottom structure including the agitation device in more detail.
Figure 4:
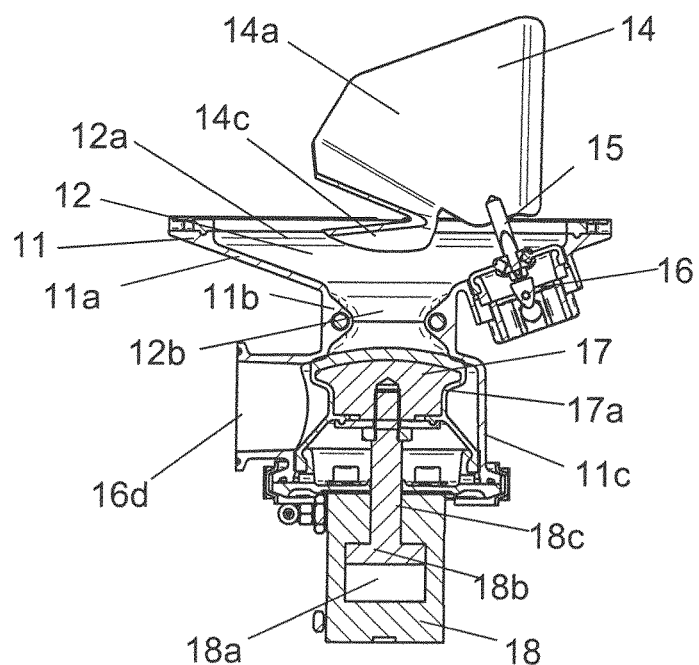
FIG. 4 shows a cross section view of the bottom structure in FIG. 3.

FIGS. 3 and 4 show the bottom structure 7 in more detail. The bottom structure 7 comprises a housing 11. The housing 11 forms an outlet portion 12 where the milk is collected before it flows out of the milk receiver 1. The outlet portion 12 is the lowermost located portion of the inner space in the milk receiver 1. The housing 11 comprises a first portion 11a forming an upper part 12a of the outlet portion. The first portion 11a of the housing has downwardly sloping walls such that the upper part 12a of the outlet portion has a continuously decreasing diameter in a downward direction. The housing 11 comprises a second portion 11b forming a lower part 12b of the outlet portion. The lower part 12b has a smaller diameter than the upper part 12a of the outlet portion 12. The housing 11 comprises a third portion 11c including an outlet member 13 to be connected to the milk conduit 8.

The bottom structure 7 comprises an agitation device in the form of an agitation member 14 which is mounted to the bottom structure 7 in such a way that when the bottom structure 7 is mounted to the milk receiver 1, the agitation member 14 will be arranged on the inside of the milk receiver 1, a movement transmission mechanism 15, and a first pneumatic actuator 16 arranged on the outside of the housing 11 in such a way that when the bottom structure 7 is mounted to the milk receiver 1, the pneumatic actuator 16 will be arranged outside of the milk receiver 1. The object of the agitation member 14 is to perform a stirring movement of the milk and provide a substantially homogenous distribution of the substances in the milk receiver 1 before a milk sample is taken. The pneumatic actuator 16 provides a movement which is transferred, via the movement transmission mechanism 15, to the agitation member 14. The movement transmission mechanism 15 extends through a wall portion of the first portion 11a of the housing.

The bottom structure 7 comprises a milk sample device in the form of a milk sample outlet 19 and a sampling cylinder 19a. By means of the milk sample outlet 19, it is possible to extract a milk sample from the lower part 12b of the outlet portion 12. The bottom structure 7 comprises an outlet valve device in the form of an outlet valve 17 movably arranged in the third portion 11c of the housing. The outlet valve 17 is movably arranged by means of a second pneumatic actuator 18. The outlet valve 17 is movably arranged between an upper position in which it closes an outlet opening at a bottom of the outlet portion 12 and a lower position in which it exposes said outlet opening such that the milk flows out of the outlet portion 12 and to the milk conduit 8. The outlet valve 17 is surrounded by an air tight flexible member 17a. The second pneumatic actuator 18 comprises a piston 18b movably arranged in an inner space 18a. The piston 18b is connected to the outlet valve 17 via a piston rod 18c. When compressed air is supplied to the inner space 18a of the actuator 18, the piston 18b and the piston rod 18c obtains a movement displacing the outlet valve 17 to the closed position. When air of ambient pressure is supplied to the inner space 18a, the outlet valve 17 is displaced to the open position.

Figure 5:
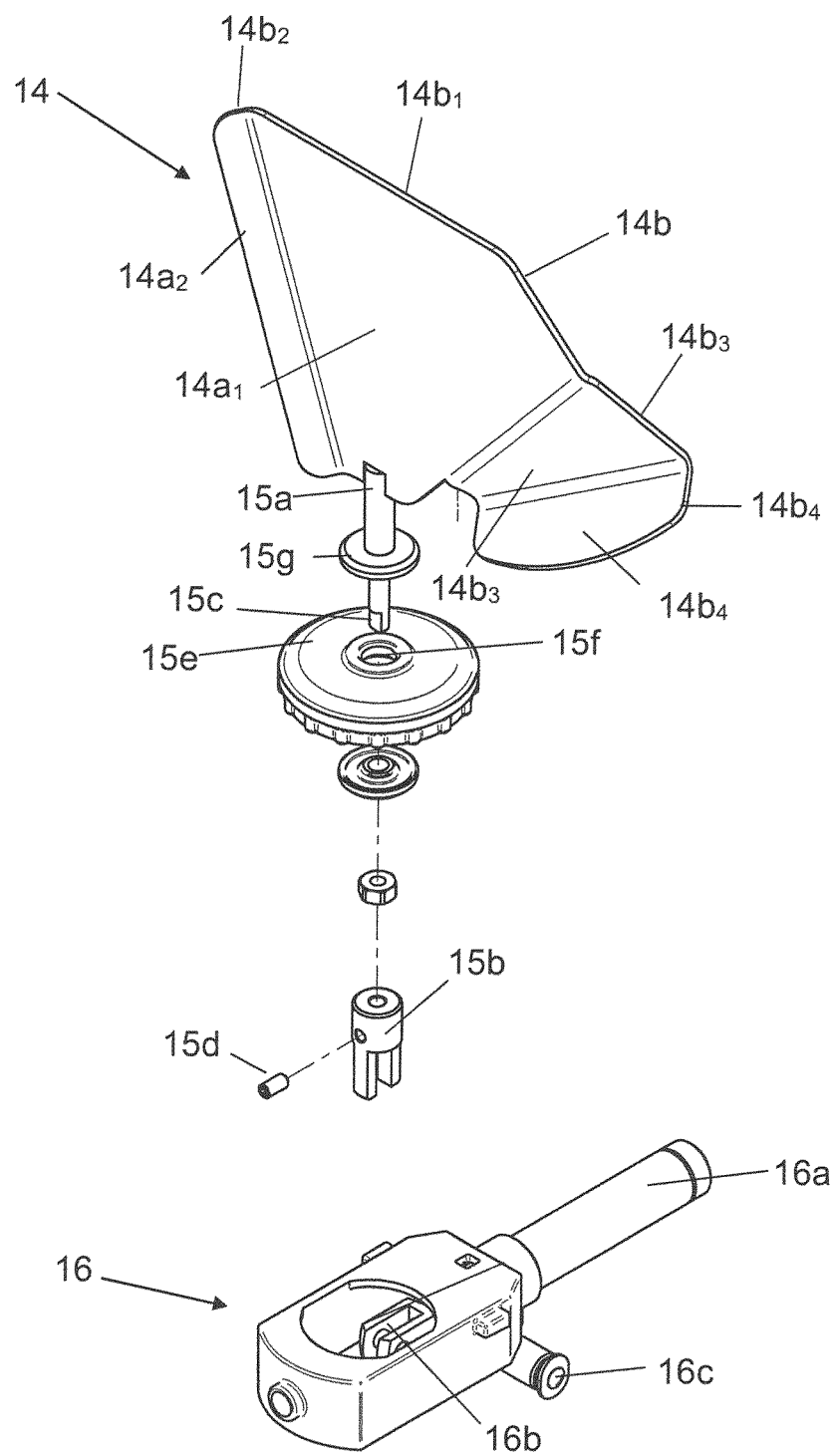
FIG. 5 shows an exploded view of the components included in the agitation device.

FIG. 5 shows the agitation member 14, the transmission mechanism 15 and the first pneumatic actuator 16 in more detail. The agitation member 14 is plate shaped with a substantially constant thickness. The agitation member 14 comprises a first side 14a and a second side 14b. The respective sides 14a, 14b of the agitation member 14 includes a number of regions $14a_{1-4}$, $14b_{1-4}$. Each region $14a_{1-4}$, $14b_{1-4}$ has a substantially flat surface forming an angle in relation to a surface of an adjacent region $14a_{1-4}$, $14b_{1-4}$. The agitation member 14 has a portion 14c to be located in the outlet portion 12. The main part of the agitation member is arranged in the lower portion 1b of the milk receiver. A smaller upper part of the agitation member 14 extends into the main portion 1a of the milk receiver 1.

The first pneumatic actuator 16 comprises a displaceable piston rod 16a provided with a connection portion 16b. The pneumatic actuator 16 comprises an air inlet portion 16c to be connected to a varying air pressure resulting in a reciprocating rectilinear movement of the piston rod 16a and the connection portion 16b. The movement transmission mechanism 15 comprises a rod element 15a. The rod element 15a is at a lower end portion connected to the connection portion 16b of the actuator 16 via a connecting member 15b. The connecting member 15b is pivotally connected to the connection portion 16b of the actuator 16. Furthermore, the connecting member 15b allows a sliding movement of the rod element 15a in a longitudinal direction in a longitudinal hole of the connecting member 15b. The rod element 15a comprises a flat portion 15c. A pin member 15d is arranged in a transverse hole of the connecting member 15b in contact with the flat portion 15c of the rod element 15a. The pin member 15d prevents turning movements of the rod element 15a in relation to the connecting member 15b and the connection portion 16b of the actuator 16. The rod element 15a is, at an upper opposite end portion, fixedly connected to the agitation member 14.

The rod element 15a extends through an opening in a wall portion of the first portion 11a of the housing. The movement transmission mechanism 15 comprises a flexible membrane 15e to be arranged in said opening. The flexible membrane 15e comprises a through hole 15f for the rod element 15a. The flexible membrane 15e has a design which provides for a liquid tight connection between its periphery and the surfaces defining the opening in the housing 11. Furthermore, the flexible member 15e provides itself or together with a sealing member 15g a liquid tight connection between the rod element 15a and the surfaces defining the through hole 15f. Furthermore, the through hole 15f provides a substantially fixed positioning of an part of the rod element located between the end portions. The through hole 15f defines a pivot point for the rod element 15a.

When the pneumatic actuator 16 performs a reciprocating linear movement, the movement of the lower end portion of the rod element 15a obtains, via the connecting member 15b, a swinging movement around the pivot point. The upper end portion of the rod element 15a provides a corresponding swinging movement in an opposite direction around the pivot point. Consequently, the agitation member 14 provides a corresponding swinging movement around the pivot point. A swinging movement of the agitation member 14 is performed within an area 20 which is indicated with dotted lines in FIG. 3.

A major part of the first side and the second side of the agitation member 14 forms a substantially right angle in relation to the swinging direction of the agitation member 14. As a consequence, the first side acts with a first pressure force on the milk when it performs a swinging movement in a first direction and the second side acts with a second pressure force on the milk when it performs a swinging movement in a second opposite direction. The first pressure force differs from the second pressure force. The first side 14a and the second side 14b provide pushing movements of the milk located in front of them in the swinging directions. The different regions $14a_{1-4}$, $14b_{1-4}$ of the respective sides 14a, 14b push the milk in somewhat different directions resulting in an increased stirring effect of the milk in the milk receiver. On the "non-pushing" sides, a negative pressure arises which also results in a stirring movement of the milk. Such a swinging movement of the agitation member 14, with a suitable moderate frequency, provides a very effective stirring movement of the milk in the milk receiver 1 at the same time as it is very gentle for the milk. Mechanical treatment of milk such as mixing of the milk increases the content of free fatty acids (FFA) in the milk. The stirring movement of the agitation member 14 according to the above does not significantly increase the content of free fatty acids in milk.

Figure 6:
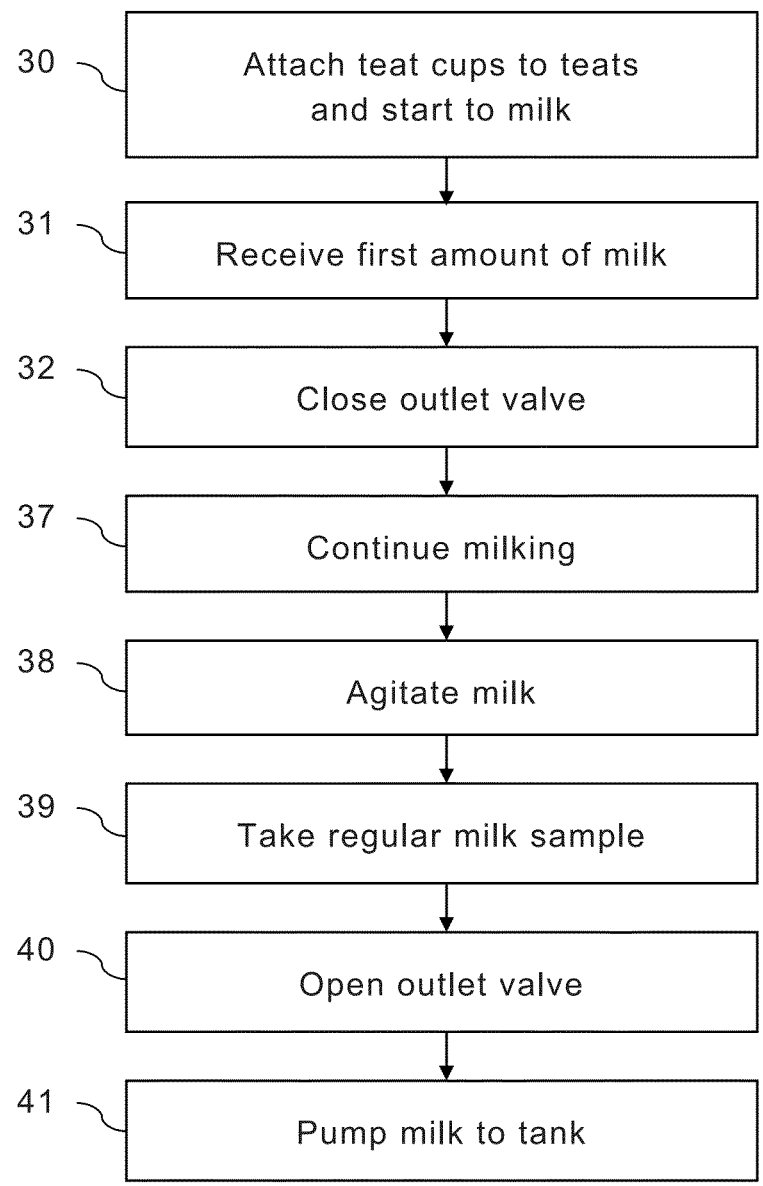
FIG. 6 shows a flow chart for taking a regular milk sample from the milk in the milk receiver.

FIG. 6 shows a flow chart for taking a regular milk sample from the milk in the milk receiver 1. The milking process of an animal starts at 30 by teat cups being attached to teats of the animal. Milk flows from the animal via the teat cups and milk tubes to the inlet portions 2 of the milk receiver 1. The milk entering the milk receiver 1 is untreated and stratifies into layers. Since the outlet valve device is open, the milk entering the milk receiver 1 flows directly out of the milk receiver 1, via the outlet portion, to the milk conduit 8. This first amount of milk from the milking process cleans the inner walls of the milk receiver 1 from milk residues from a previous milking process. If the inlet portions 2 are tangential, this cleaning effect will be further increased. The first amount of milk is at 31 collected in the milk conduit 8 in a position downstream of the outlet valve 17 of the milk receiver 1 but upstream of the milk pump 9. The milk pump 9 is not activated, because it is advantageous not to pump small quantities of milk—this is gentler for both the pump and the milk. The control unit 10 continuously receives information from the flow meters 4a about the milk flow to the milk receiver 1 and estimates the milk quantity supplied to the milk receiver 1. When a predetermined first amount of milk, which may e.g. be 500 ml, has entered the milk receiver 1, the control unit 10 activates, at 32, the second pneumatic actuator 18 such that it moves the outlet valve 17 to the closed position. Milking continues at 37, and the milk is now collected in the milk receiver 1 instead of in the milk conduit 8.

The control unit 10 continuously receives information from the milk level meter 4b, which may e.g. be a float, of the milk level in the milk receiver 1. At some point, preferably when the milk level is high enough to cover the agitation member 14, the control unit 10 at 38 activates the first pneumatic actuator 16 such that it performs a reciprocating swinging movement of the agitation member 14. The reciprocating swinging movement of the agitation member 14 provides a gentle but effective stirring process of the milk in the whole receiver 1. As a consequence, the stirring process results in a homogenous mixture of the different layers and substantially all included substances in the whole receiver 1.

When the milking process in the milking stall has finished, the control unit 10 stops the activation of the pneumatic actuator 16 and the swinging movement of the agitation member 14 ceases. A regular milk sample is now, at 39, taken of the milk in the milk receiver 1. The regular milk sample is extracted, via the milk sample outlet 19, from the outlet portion 12 of the milk receiver 1. The regular milk sample may be directed to a test tube or the like, or directly to an analysis instrument. It is possible to instead take the regular milk sample during the final part of the milking process, before it has ended. In either case, it is not necessary to stop the swinging movement of the agitation member 14 before the regular milk sample is taken.

When the regular milk sample has been taken, the control unit 10 activates the second pneumatic actuator 18, at 40, such that it moves the outlet valve 17 to the open position. The milk flows out from the milk receiver 1 to the milk conduit 8. After a delay of typically a few seconds to allow the air in the milk conduit 8 to bubble up through the milk, the control unit 10 starts, at 41, the milk pump 9 such that the milk in the milk conduit 8 is pumped to a main milk tank where it is mixed with milk from other milking stalls. When the control unit 10 receives information from the milk level meter 4b indicating that the milk receiver is empty, the control unit 10 stops the activation of the milk pump. The outlet valve 17 is maintained in the open position such that any remaining milk residues are able to flow out from the milk receiver 1. The outlet valve 17 is then kept open until the control unit 10 closes it at 32 during the milking process of the next animal.

Figure 7:
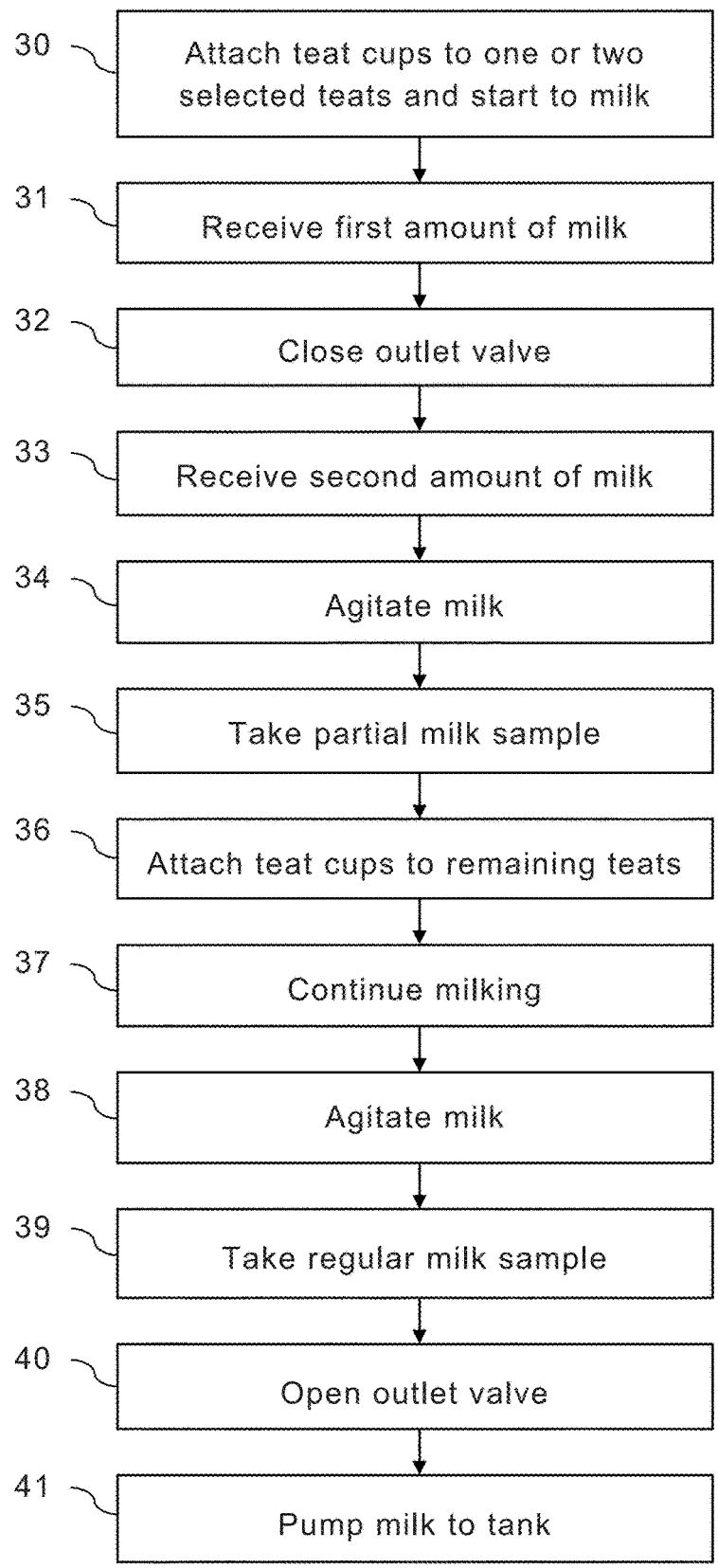
FIG. 7 shows a flow chart for also taking a partial milk sample from the milk in the milk receiver.

FIG. 7 shows a flow chart for also taking a partial milk sample from the milk in the milk receiver 1. The milking process of a selected animal starts at 30 by teat cups being attached only to one or two selected teats of the animal. Milk flows from the selected teats via the teat cups and milk tubes to the inlet portions 2 of the milk receiver 1. Since the outlet valve device is open, the milk entering the milk receiver 1 flows substantially immediately out of the milk receiver 1, via the outlet portion, to the milk conduit 8. This first amount of milk from the milking process cleans the inner walls of the milk receiver 1 from milk residues from a previous milking process. If the inlet portions 2 are tangential, this cleaning effect will be further increased. The first amount of milk is collected in the milk conduit 8 in a position downstream of the outlet valve 17 of the milk receiver 1 but upstream of the milk pump 9. The control unit 10 receives information from the flow meters 4a about the milk flow to the milk receiver 1. The control unit 10 continuously receives information from the flow meters 4a about the milk flow to the milk receiver 1 and estimates the milk quantity supplied to the milk receiver 1. When a predetermined first amount of milk, which may e.g. be 500 ml, has entered the milk receiver 1, the control unit 10 activates, at 32, the second pneumatic actuator 18 such that it moves the outlet valve 17 to the closed position. Milking of the selected teats continues at 33 until a second amount of milk (which may be either a predetermined amount or all the milk from the selected teats) has entered the milk receiver 1. The milk is now collected in the milk receiver 1 instead of in the milk conduit 8.

The control unit 10 continuously receives information from the milk level meter 4b of the milk level in the milk receiver 1. At some point, preferably when the milk level is high enough to cover the agitation member 14, the control unit 10 at 34 activates the first pneumatic actuator 16 such that it provides a gentle but effective stirring process of the milk in the whole receiver 1.

A partial milk sample is now, at 35, taken of the milk in the milk receiver 1. The partial milk sample is extracted, via the milk sample outlet 19, from the outlet portion 12 of the milk receiver 1. The partial milk sample may be directed to a test tube or the like, or directly to an analysis instrument. It is possible but not necessary to stop the swinging movement of the agitation member 14 before the partial milk sample is taken.

When the partial milk sample has been taken, teat cups are at 36 attached to the remaining teats of the animal and milking continues at 37. Milk flows from the remaining teats via the teat cups and milk tubes to the inlet portions 2 of the milk receiver 1. If the swinging movement of the agitation member 14 was stopped before the partial milk sample was taken, the control unit 10 at some point again at 38 activates the first pneumatic actuator 16 such that it provides a gentle but effective stirring process of the milk in the whole receiver 1. If the swinging movement of the agitation member 14 was not stopped before the partial milk sample was taken, agitation of the milk simply continues at 38.

When the milking process in the milking stall has finished, the control unit 10 stops the activation of the pneumatic actuator 16 and the swinging movement of the agitation member 14 ceases. A regular milk sample is now, at 39, taken of the milk in the milk receiver 1. The regular milk sample is extracted, via the milk sample outlet 19, from the outlet portion 12 of the milk receiver 1. The regular milk sample may be directed to a test tube or the like, or directly to an analysis instrument. It is possible to instead take the regular milk sample during the final part of the milking process, before it has ended. In either case, it is not necessary to stop the swinging movement of the agitation member 14 before the milk sample is taken.

When the regular milk sample has been taken, the control unit 10 activates the second pneumatic actuator 18, at 40, such that it moves the outlet valve 17 to the open position. The milk flows out from the milk receiver 1 to the milk conduit 8. After a delay of typically a few seconds to allow the air in the milk conduit 8 to bubble up through the milk, the control unit 10 starts, at 41, the milk pump 9 such that the milk in the milk conduit 8 is pumped to a main milk tank where it is mixed with milk from other milking stalls. When the control unit 10 receives information from the milk level meter 4b indicating that the milk receiver is empty, the control unit 10 stops the activation of the milk pump. The outlet valve 17 is maintained in the open position such that any remaining milk residues are able to flow out from the milk receiver 1. The outlet valve 17 is then kept open until the control unit 10 closes it at 32 during the milking process of the next animal.

The invention is not restricted to the described embodiment but may be varied freely within the scope of the claims. Any kind of milk receiver 1 can be used, and agitation of the milk does not have to be done using a mechanical stirrer, but can take place in any conceivable way, e.g. by pumping the milk or supplying air to the receiver.

The invention claimed is:

1. A method of sampling milk in a milking machine comprising teat cups, a milk receiver (1) to which vacuum from a vacuum supply (5, 6) draws milk from the teats cups, and a milk sampling arrangement, the milk sampling arrangement comprising an agitation device configured to provide a stirring process of the milk in the milk receiver (1), a milk sample device configured to extract a milk sample from the milk in the milk receiver (1), and an outlet valve device configured to control the milk flow out of the milk receiver (1), the method comprising the steps of:
- attaching (30) the teat cups to teats of an animal and starting to milk said teats;
- receiving (31) a first amount of milk in the milk receiver (1) while keeping the outlet valve device open;
- closing (32) the outlet valve device;
- after closing (32) the outlet valve device, continuing (37) the receiving of milk in the milk receiver (1);
- after closing (32) the outlet valve device, agitating (38) the milk in the milk receiver (1) using the agitation device; and
- after agitating (38) the milk in the milk receiver (1) using the agitation device, using the milk sample device to take (39) a regular milk sample from the milk in an outlet portion (12) of the milk receiver (1); and
- after taking (39) the regular milk sample from the milk in the outlet portion (12) of the milk receiver (1), opening (40) the outlet valve device so that the milk is transferred (41) to the milk tank.

2. A method according to claim 1, wherein the method comprises the further step of collecting at least a part of the first amount of milk in a milk conduit (8) in a position downstream of the outlet valve device of the milk receiver (1) and upstream of a non-activated milk pump (9).

3. A method according to claim 1, wherein the method comprises the further step of activating the agitation device as soon as a milk level in the milk receiver (1) has reached a predetermined level.

4. A method according to claim 3, wherein the method comprises the further step of activating the agitation device as soon as the milk level in the milk receiver (1) is high enough to cover the whole agitation member (14).

5. A method according to claim 1, wherein the method comprises the further step of maintaining the outlet valve device open when the milk receiver (1) has been emptied of milk from a milking process.

6. A method according to claim 1, wherein the step of attaching (30) the teat cups to teats of an animal and starting to milk said teats comprises, for a selected animal, attaching (30) the teat cups only to one or two selected teats and starting to milk said one or two selected teats, wherein the method comprises the further steps of:
- after closing the outlet valve device (32), receiving (33) a second amount of milk in the milk receiver (1);
- agitating (34) the milk in the milk receiver (1) using the agitation device;
- taking (35) a partial milk sample from the milk in an outlet portion (12) of the milk receiver (1) by means of the milk sample device; and
- after taking (35) said partial milk sample, attaching (36) teat cups to the remaining teats of the animal and milking said remaining teats.

7. A method according to claim 6, wherein the selected animal is an animal for which a milk sample analysis of a milk sample taken in connection with a previous milking has determined an elevated risk of a disease.

8. A method according to claim 6, wherein the selected animal is an animal for which a milk sample of milk originating from the one or two selected teats has not been taken for a predetermined period of time.

9. A method according to claim 1, wherein the milk sampling arrangement comprises a control unit (10) configured to control the agitation device, the milk sample device and the outlet valve device, and the method further uses the control unit (10) to control the agitation device, the milk sample device and the outlet valve device.

10. A method according to claim 1, wherein the milk sample device comprises a milk sampling outlet (19) configured to extract milk samples from the milk in the outlet portion (12), and the milk sampling outlet (19) is operated to extract milk samples from the milk in the outlet portion (12).

11. A method according to claim 1, wherein the milk sample device and the outlet valve device are included in a bottom structure (7) and the method includes mounting the bottom structure at a bottom portion of the milk receiver (1).

12. A method according to claim 11, further comprising using a releasable connection member (21) to mount the bottom structure (7) to the bottom portion of the milk receiver (1).

13. A method according to claim 11, wherein the bottom structure (7) is mounted so that the bottom structure (7) defines an outlet portion (12) of the milk receiver (1) located at a lower level than remaining parts of the inner space of the milk receiver (1).

14. A method according to claim 13, wherein, the outlet portion (12) comprises an outlet opening and the outlet valve device comprises an outlet valve (17), operation of the outlet valve to a first position closes the outlet opening and operation of the outlet valve to a second position exposes the outlet opening.

15. A method according to claim 14, wherein the outlet valve device comprises an actuator (18) configured to move the outlet valve (17) between the first closed position and the second open position, and the actuator (18) is operated to move the outlet valve (17) between the first closed position and the second open position.

16. A method according to claim 1, wherein,
- the milk sample device and the outlet valve device are included in a bottom structure (7) that comprises a housing (11) defining an upper part (12a) of the outlet portion and a lower part (12b) of the outlet portion, the upper part (12a) having a diameter that is successively decreasing in a downward direction toward the lower part (12b) and the lower part (12b) having a diameter that is smaller than the diameter of the upper part (12a), and
- the bottom structure is mounted at a bottom portion of the milk receiver (1).

17. A method according to claim 11, wherein,
- the agitation device comprises an agitation member (14) which is mounted to the bottom structure (7), and
- the method further comprising mounting the bottom structure (7) to the milk receiver (1) so that i) the agitation member (14) is arranged on the inside of the milk receiver, ii) an actuator member (16) which is mounted to the bottom structure (7) is mounted to the milk receiver (1), with the actuator member (16) being arranged outside of the milk receiver (1), and iii) a movement transmission mechanism (15) is configured to transmit movement from the actuator (16) to the actuator member (14).

18. A method according to claim 17, wherein the actuator (16) and the movement transmission mechanism (15) together are operated to provide a swinging movement of the agitation member (14) in the milk receiver (1).

19. A milking machine comprising:
  teat cups;
  a milk receiver (1) to which vacuum from a vacuum supply (5, 6) draws milk from the teats cups;
  a milk sampling arrangement, the milk sampling arrangement comprising
  i) an agitation device configured to provide a stirring process of the milk in the milk receiver (1),
  ii) a milk sample device configured to extract a milk sample from the milk in the milk receiver (1), and
  iii) an outlet valve device configured to control milk flow out of the milk receiver (1); and
  an electric control unit (10) that automatically, for a selected animal, controls the outlet valve device to keep the outlet valve device open to extract a partial milk sample from milk in the milk receiver (1) after attachment of the teat cups to one or two selected teats of the selected animal but before the attachment of the teat cups to remaining teats of the selected animal.

* * * * *